(12) United States Patent
Akula

(10) Patent No.: US 11,132,638 B2
(45) Date of Patent: Sep. 28, 2021

(54) PRODUCT PREDICTIONS AND SHIPMENTS USING IOT CONNECTED DEVICES

(71) Applicant: Oracle International Corporation, Redwood Shores, CA (US)

(72) Inventor: Dheeraj Akula, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 16/119,621

(22) Filed: Aug. 31, 2018

(65) Prior Publication Data

US 2020/0074390 A1    Mar. 5, 2020

(51) Int. Cl.
  *G06Q 10/08* (2012.01)
  *H04L 29/08* (2006.01)

(52) U.S. Cl.
  CPC ......... *G06Q 10/087* (2013.01); *G06Q 10/083* (2013.01); *H04L 67/12* (2013.01)

(58) Field of Classification Search
  CPC ......... G06Q 10/08; G06Q 10/00; H04L 29/08
  USPC ........................................................ 705/28
  See application file for complete search history.

(56) References Cited

U.S. PATENT DOCUMENTS

| | | | | |
|---|---|---|---|---|
| 6,557,530 B1* | 5/2003 | Benson | ............ | F02D 41/22 123/447 |
| 8,255,265 B2* | 8/2012 | Warier | ............ | G06Q 10/04 705/7.31 |
| 8,325,036 B1* | 12/2012 | Fuhr | ............ | G08B 13/19613 340/540 |
| 8,600,835 B1* | 12/2013 | Lueck | ............ | G06Q 30/0283 705/26.1 |
| 10,308,430 B1* | 6/2019 | Brady | ............ | B65G 1/1373 |
| 10,332,067 B2* | 6/2019 | Sirisilla | ............ | G06Q 10/087 |
| 10,373,117 B1* | 8/2019 | Sadighian | ............ | G06Q 10/0875 |
| 10,546,269 B1* | 1/2020 | Gaurav | ............ | G06Q 10/0875 |
| 10,607,182 B2* | 3/2020 | Shah | ............ | G06K 9/00771 |

(Continued)

OTHER PUBLICATIONS

E-Commerce Supply Chain Process Optimization Based on Whole-Process Sharing of Internet of Things Identification Technology Xu, Shiyan; Chen, Jun; Wu, Maoguo; Zhao, Chenyang.Computer Modeling in Engineering & Sciences; Henderson vol. 126, Iss. 2, (2021): 843-854. (Year: 2021).*

(Continued)

*Primary Examiner* — Oluseye Iwarere
(74) *Attorney, Agent, or Firm* — Potomac Law Group, PLLC

(57) ABSTRACT

Systems and methods are provided for capturing product indications from an Internet of Things connected device to estimate supply and replenish. An indication can be received from the IoT connected device located at a location, wherein the indication corresponds to a product stocked at the location. A plurality of indications corresponding to the product can be captured over a period of time. A supply level of the product at one or more warehouses can be established based on the indications, wherein the one or more warehouses supply the location with the product. Computer code can be executed to generate an instruction to ship the product from a supplier to the one or more warehouses based on the estimated supply level. The product can be shipped from the supplier to the one or more warehouses based on the executed computer code.

20 Claims, 8 Drawing Sheets

(56) References Cited

U.S. PATENT DOCUMENTS

| | | | |
|---|---|---|---|
| 2002/0063883 A1* | 5/2002 | Joyce | G03G 15/6502 358/1.15 |
| 2003/0216969 A1* | 11/2003 | Bauer | H01Q 7/00 705/22 |
| 2004/0111699 A1* | 6/2004 | Rockwell | G06Q 10/0875 717/103 |
| 2004/0230503 A1* | 11/2004 | Lucas | G06Q 10/06 705/28 |
| 2008/0015951 A1* | 1/2008 | Kerker | G06Q 10/0875 705/7.29 |
| 2014/0100769 A1* | 4/2014 | Wurman | G06Q 10/087 701/301 |
| 2015/0186836 A1* | 7/2015 | Chouhan | G06F 16/9535 705/28 |
| 2016/0125492 A1* | 5/2016 | Walker | G06Q 30/0613 705/26.41 |
| 2017/0116572 A1* | 4/2017 | Natarajan | G06Q 20/202 |
| 2017/0132393 A1* | 5/2017 | Natarajan | G06Q 10/087 |
| 2017/0206489 A1* | 7/2017 | Sirisilla | G06Q 30/0633 |
| 2017/0351417 A1* | 12/2017 | Manico | G06F 16/50 |
| 2018/0053153 A1* | 2/2018 | Mai | G06Q 30/0633 |
| 2018/0060804 A1* | 3/2018 | Cheruku | G06K 9/4661 |
| 2018/0089613 A1* | 3/2018 | Chen | G02B 5/208 |
| 2018/0091391 A1 | 3/2018 | Turow et al. | |
| 2018/0096290 A1* | 4/2018 | Awad | G06Q 10/087 |
| 2018/0144292 A1* | 5/2018 | Mattingly | G06Q 10/087 |
| 2018/0157993 A1* | 6/2018 | Northrup | G06N 5/04 |
| 2018/0181908 A1* | 6/2018 | Jones | G06K 7/10366 |
| 2018/0189726 A1* | 7/2018 | Freeman | G06Q 90/00 |
| 2018/0197135 A1* | 7/2018 | Moyer | G06Q 50/10 |
| 2018/0204267 A1* | 7/2018 | Licht | G06Q 30/0635 |
| 2018/0225612 A1* | 8/2018 | Enssle | G06Q 10/06315 |
| 2018/0255516 A1* | 9/2018 | Jurthe | H04W 48/02 |
| 2018/0265296 A1* | 9/2018 | Beckman | B61L 15/0081 |
| 2018/0300677 A1* | 10/2018 | Wilkinson | G07C 9/00896 |
| 2018/0308051 A1* | 10/2018 | Nemati | G06Q 10/08345 |
| 2018/0319607 A1* | 11/2018 | Nemati | G05B 19/4189 |
| 2018/0321660 A1* | 11/2018 | Nemati | G06Q 10/087 |
| 2018/0322448 A1* | 11/2018 | Nemati | G06K 9/00771 |
| 2019/0147400 A1* | 5/2019 | Knight | G06Q 10/0875 |
| 2019/0149725 A1* | 5/2019 | Adato | H04N 5/23206 348/158 |
| 2019/0156270 A1* | 5/2019 | Karmakar | G06Q 30/0201 |
| 2019/0165967 A1* | 5/2019 | Wallace | G06Q 10/087 |
| 2019/0237176 A1* | 8/2019 | O'brien | H04L 9/006 |
| 2019/0246071 A1* | 8/2019 | Chen | G06K 9/00771 |
| 2019/0266554 A1* | 8/2019 | Lin | G06Q 30/0202 |
| 2019/0287063 A1* | 9/2019 | Skaaksrud | B65D 88/524 |
| 2019/0310891 A1* | 10/2019 | Baldasaro | G06F 9/5072 |
| 2019/0339688 A1* | 11/2019 | Cella | G05B 19/4185 |
| 2019/0370888 A1* | 12/2019 | Walker | G08C 17/02 |
| 2020/0074371 A1* | 3/2020 | Bogolea | G06Q 10/087 |
| 2020/0074390 A1* | 3/2020 | Akula | G06Q 10/083 |
| 2020/0133254 A1* | 4/2020 | Cella | G05B 23/0283 |

OTHER PUBLICATIONS

Intelligent IoT-Based Cross-Border e-Commerce Supply Chain Performance Optimization Xia, Lei ; Liu, Sitong; Yu, Peng Wireless communications and mobile computing, Jun. 22, 2021, vol. 2021, p. 1-13 (Year: 2021).*

Anonymous, "Sample Blueprint: Remote Device Monitoring and Maintenance Part 1"; last retrieved from http://www.oracle.com/webfolder/technetwork/tutorials/obe/cloud/iot/Solution%20Blueprint/Remote%20Asset%20Management/part1.html on Aug. 30, 2018.

* cited by examiner

PRODUCT PREDICTIONS AND SHIPMENTS USING IOT CONNECTED DEVICES

FIELD

The embodiments of the present disclosure generally relate to capturing product indications from an Internet of Things ("IoT") connected device to estimate supply and replenish.

BACKGROUND

The Internet of Things has generated an increasing number of connected devices. In some instances, these connected devices can be used to submit an order for a product. However, many of these implementations are consumer oriented. Enterprise entities, such as large corporations or businesses, can often have logistical circumstances that are more complex than a consumer's circumstances. Moreover, an enterprise may prefer to keep certain data confidential to maintain a competitive advantage in a marketplace. As a result, IoT connected devices that service enterprise entities can require sophisticated technical solutions to solve problems posed by these complex logistical circumstances.

SUMMARY

The embodiments of the present disclosure are generally directed to systems and methods for capturing product indications from an Internet of Things connected device to estimate supply and replenish that substantially improve upon the related art. An indication can be received from the IoT connected device located at a location, wherein the indication corresponds to a product stocked at the location. A plurality of indications corresponding to the product can be captured over a period of time. A supply level of the product at one or more warehouses can be established based on the indications, wherein the one or more warehouses supply the location with the product. Computer code can be executed to generate an instruction to ship the product from a supplier to the one or more warehouses based on the estimated supply level. The product can be shipped from the supplier to the one or more warehouses based on the executed computer code.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
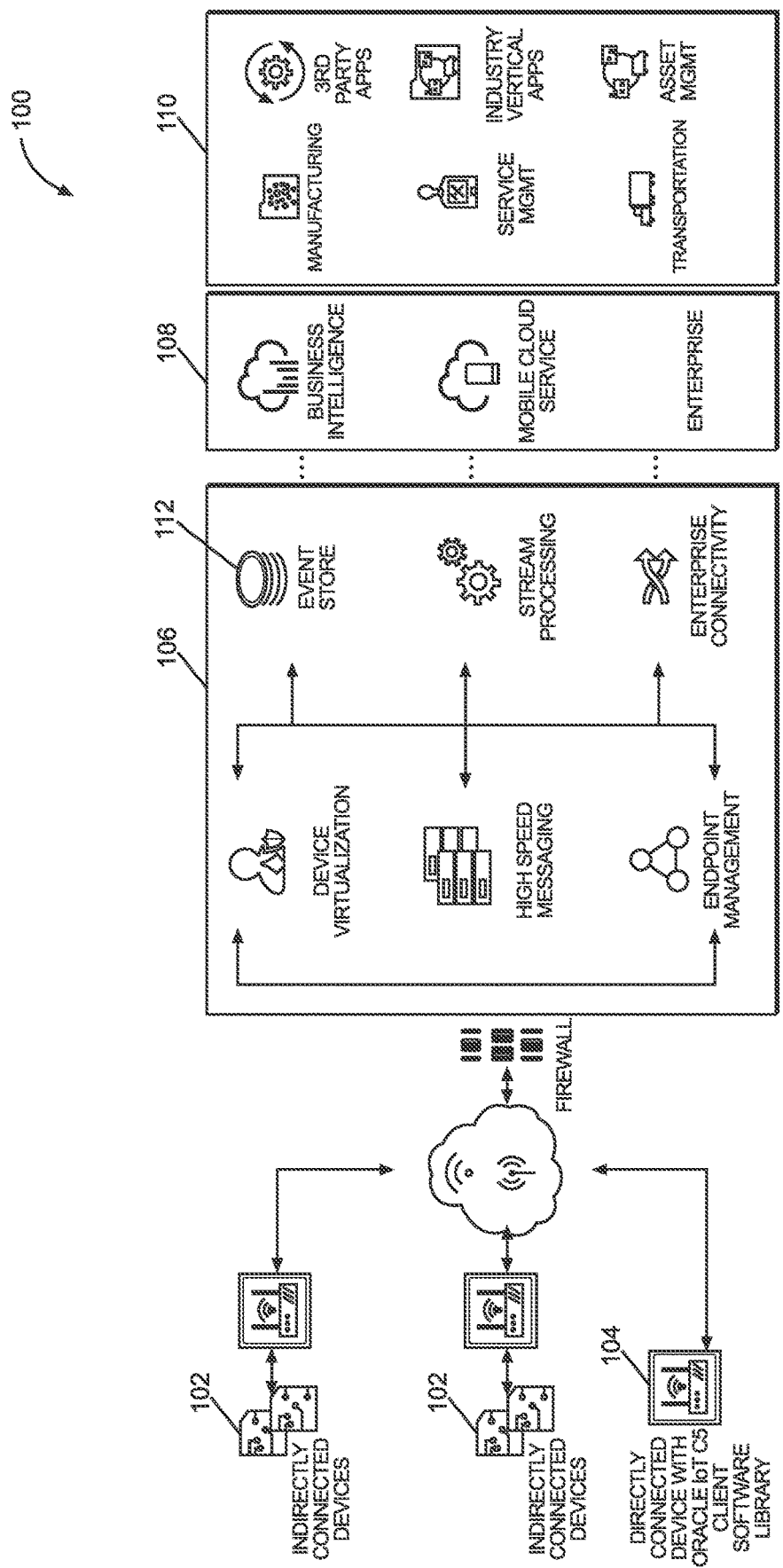
FIG. 1 illustrates a system for communicating with IoT connected devices according to an example embodiment.

Embodiments capture product indications from an IoT connected device to estimate supply and replenish. For example, a location of an enterprise business, such as a retail location, service location, or office location, can consume or sell one or more products. As a product's stock becomes low at one of these locations, the stock can be replenished such that the product can continue to be sold or consumed. Embodiments include IoT devices, such as an IoT device with a button, at enterprise locations that transmit indications of low stock for a product. For example, an employee or customer located at an enterprise location can press a button of an IoT device to transmit an indication of low stock for a product.

In some embodiments, the indication can be received by a plurality of entities. For example, the indication can be received by an internal system of the enterprise, and a warehouse of the enterprise can be instructed to ship stock of the product to the enterprise location (e.g., retail or service location from which the indication is received). In some embodiments, the warehouse may store a plurality of different products and may service (e.g., ship stock to) a plurality of different enterprise locations.

In some embodiments, a supplier to the enterprise can receive the indication from the IoT device. In some embodiments, the supplier may supply the enterprise organization with one or more products. For example, the supplier may ship products to the enterprise warehouse, and in turn the enterprise warehouse may service (e.g., ship the supplied stock) to the plurality of enterprise locations. In some embodiments, an internal system of the supplier may capture a plurality of indications from the IoT devices at the plurality of enterprise locations. In an example, the plurality of indications can each indicate low stock of a particular product at different enterprise locations serviced by the enterprise warehouse.

Based on the captured indications, the internal system of the supplier can estimate a stock for products at the warehouse. For example, a depletion metric can be assigned to each received indication that predicts a depletion of stock for a particular product at the enterprise warehouse. In some implementations, the signal from the IoT device received at the internal system of the supplier is indicative of stock shipped from the warehouse to one of the enterprise locations, and thus can be indicative of depleted product stock at the warehouse.

An order history for the enterprise/warehouse can be used to determine device specific depletion metrics (e.g., specific to a particular IoT device) or location specific depletion metrics (e.g., specific to a particular enterprise location). In some embodiments, the order history can also be used to determine baseline levels of product stock at the warehouse. Given the baseline level of product stock and the predicted level of depletion, the internal system of the supplier can estimate when supply levels for the product are low at the warehouse, and thus ship additional product to the warehouse (e.g., submit, to the enterprise, an approval request to ship additional product, and perform the shipment upon receiving approval).

Enterprise implementations of stock replenishment can encounter problems due to the complex circumstances for enterprise organizations. For example, enterprise inventory is often considered highly confidential since competitors could use such information to place the enterprise at a competitive disadvantage. Accordingly, precise levels of enterprise inventory can be hidden from partners that do business with the enterprise, such as suppliers of product. In addition, because an enterprise will often stock inventory at a central location (e.g., warehouse) and distribute the inventory as needed to various locations (e.g., enterprise locations), each IoT device indication received from an enterprise location does not correspond to an immediate need for new product from the supplier.

In various embodiments, an internal system of the supplier can estimate supply levels (e.g., according to determined depletion metrics) at an enterprise warehouse to compensate for the problems caused by these complex circumstances. For example, the estimated supply is unlikely to cause competitive disadvantages because of its degree of precision. In particular, the stock estimate is precise enough to use to predict timely product shipments, but not so precise as to give competitors valuable information to use against the enterprise. In addition, embodiments determine device specific (e.g., specific to the transmitting IoT device) or location specific (e.g., specific to the location from which the IoT device transmitted the indication) depletion metrics, thus addressing the problem posed by a central warehouse distributing product to a plurality of enterprise locations.

In addition, the described techniques can achieve perpetual inventory at an enterprise business warehouse even in the presence of these complex circumstances. Perpetual inventory can provide a number of efficiency benefits, such as streamlined logistics (e.g., shipments, scheduling, and the like), increased resource utilization, increased availability of resource when they are needed, and reduced overhead. Achieving perpetual inventory without exposing sensitive proprietary information can greatly benefit the logistical efficiencies for an enterprise without exposing the enterprise to undue risk. Accordingly, the technological solution provided by embodiments of the disclosure provide a number of advantages that can overcome specific problems in the industry.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

In various embodiments, IoT connected devices are implemented. In some embodiments, the IoT connected device can be an electronic device that is a portable communication device such as a mobile phone, smartphone, tablet, and the like. A user interface for the device may include a touchscreen and/or other input/output devices. It should be understood, however, that the user interfaces and associated methods may be applied to other devices, such as personal computers, laptops, and the like which may include one or more other physical user-interface devices, such as a keyboard and or mouse, or any other suitable user-interface device.

The electronic device may support a variety of applications, such as an Internet browser, text messenger, experience management, and various other applications. The various applications that may be executed on the electronic device may use at least one common physical user-interface device. In addition, a common physical architecture of the electronic device may support a variety of applications with user interfaces that are intuitive and transparent. In the discussion that follows, the IoT device services are used as example embodiments, but it should be understood that the described functionality may be readily applied to other applications.

FIG. 1 is a system for communicating with IoT connected devices according to an example embodiment. As shown in FIG. 1, system 100 includes indirectly connected devices 102, directly connected devices 104, IoT cloud service 106, cloud service 108, event store 112, and enterprise applications 110. In some embodiments, directly connected devices 104 can be electronic devices that include IoT client software (e.g., Oracle® IoT Client Software Library) for communicating with IoT cloud services 106. Indirectly connected devices 102 can communicate with IoT cloud service 106 using one or more access points, such as a gateway device that includes IoT client software (e.g., Oracle® IoT Cloud Server Gateway software or Oracle® IoT Cloud Server Client Software Library).

In various embodiments, connected devices can be considered the "things" in the Internet of Things that transmit data to a cloud server. Analytics can then be used to filter and analyze data transmitted from the connected devices. In some implementations, built-in or custom enterprise applications can be integrated such that data can be passed along for further processing. The enterprise applications can transmit reply data (e.g., custom messages or actions) to one or more of the connected devices. For example, the reply from the applications can instruct the connected devices to perform certain tasks or transmit additional data.

Indirectly connected devices 102 and/or connected devices 104 can be any mobile phone, smartphone, tablet, or any suitable electronic device that communicates using wired or wireless communication protocols (e.g., by transmitting and/or receiving wired signals using a connection port or wireless signals with an antenna or transceiver). For example, indirectly connected devices 102 and/or connected devices 104 can be any IoT electronic device that can connect to the Internet. In some embodiments, indirectly connected devices 102 and/or connected devices 104 can be an electronic device with a moveable element, such as a button, that a user can interact with (e.g., to trigger a transmission of data). For example, indirectly connected devices 102 and/or connected devices 104 can be similar to an Amazon Dash® button, Shortcut Labs Flic® button, or any other suitable IoT device.

In some embodiments, indirectly connected devices 102 and/or connected devices 104 can communicate with other electronic devices or wireless access points using a variety of protocols, such as Internet Protocol v. 6 ("IPv6"), Transfer Control Protocol ("TCP"), User Datagram Protocol ("UDP"), Datagram Transport Layer Security ("DTLS"), Java Message Service ("JMS"), Hypertext Transfer Protocol ("HTTP"), RESTful HTTP ("REST"), code division multiple access ("CDMA"), global system for mobile communication ("GSM"), long term evolution ("LTE"), Wi-Fi, Wireless Area Network ("WAN") protocols, Low Power Wide Area ("LPWA") protocols, LoRaWAN, Bluetooth®, Zigbee, Near-Field Communication ("NFC"), or any other suitable wired or wireless protocol.

Further, indirectly connected devices 102 and/or connected devices 104 can communicate using one or more IoT communication protocols, such as an IPSO Smart Objects protocol stack, an Oracle® Internet of Things Cloud protocol stack, or any other suitable IoT protocol. In some examples, indirectly connected devices 102 and connected devices 104 can access wired or wireless communication networks, such as the Internet, by communicating with a network connected access point, such as a base station, access node, wired or wireless router, or any other suitable access point. In some embodiments, indirectly connected devices 102 and/or connected devices 104 may support a variety of applications, such as an Internet browser, messaging applications, device management applications, other various IoT applications, and any other suitable application.

IoT cloud service 106 can provide various cloud services to IoT connected devices, such as Oracle® IoT Cloud Service. Examples of cloud services available can include device virtualization, high speed messaging, endpoint (e.g., device) management, event store, stream processing, enterprise connectivity, and any other suitable IoT cloud service. Device virtualization can abstract each IoT device (e.g., indirectly connected devices 102 and/or connected devices 104) as a programming object with read/write data properties and message formats. The IoT device's health, performance, and location can be monitored/collected using one or more application programming interfaces ("APIs"). Device virtualization can allow applications to transmit telemetry messages and device data from the IoT connected devices to IoT cloud service 106. High speed messaging at IoT cloud service 106 can provide reliable protocol independence and bidirectional communication among IoT devices in a network (e.g., indirectly connected devices 102 and/or connected devices 104), the IoT cloud service 106, cloud service 108, enterprise applications 110, and any other back-end or service otherwise connected to IoT cloud service 106.

Endpoint management can securely manage devices in an IoT network (e.g., indirectly connected devices 102 and/or connected devices 104), deploy software to those devices, and manage security policy for those devices. For example, one or more APIs and/or a management console can be used to achieve this functionality. In various embodiments, an endpoint can be a gateway, a programmable device, a device software running IoT cloud service 106 software (e.g., an Oracle® IoT Cloud Service Gateway device), an adapter, or an enterprise application, for example. Endpoint management can apply uniform security for these various endpoint types to validate various communications/instructions to IoT cloud service 106.

Event store 112 can store messages and other data for IoT network devices (e.g., indirectly connected devices 102 and/or connected devices 104). For example, messages sent to and from the IoT devices can be stored in a database. Stream processing can perform analysis (e.g., real-time analysis) of streams of information that are sent from IoT devices (e.g., indirectly connected devices 102 and/or connected devices 104) to IoT cloud service 106. Stream processing can perform correlation, aggregation, filtering, and analytics of time-based data. In some embodiments, event processing analysis patterns can be built-in and accessible using visual interfaces.

Enterprise connectivity can provide a secure communication channel for communication with (e.g., pushing messages to) enterprise applications (e.g., cloud service 108 and/or enterprise applications 110), and for the enterprise applications to push or pull messages from IoT cloud service 106. In some embodiments, IoT cloud service 106 software (e.g., Oracle® IoT Cloud Service Client Software Enterprise Library and REST APIs) enable enterprise applications to send commands to IoT devices.

IoT device data and alerts that are sent to IoT cloud service 106 can be analyzed by integrating an IoT application with one or more enterprise applications. Example software for cloud service 108 can include Oracle® Business Intelligence Cloud Service, Oracle® Mobile Cloud Service, Oracle® Storage Cloud Service, and/or Oracle® JD Edwards EnterpriseOne IoT Orchestrator instances. Example enterprise applications 108 can include manufacturing applications, service management applications, industry vertical applications, transportation applications, asset management applications, and other third-party applications.

Figure 2:
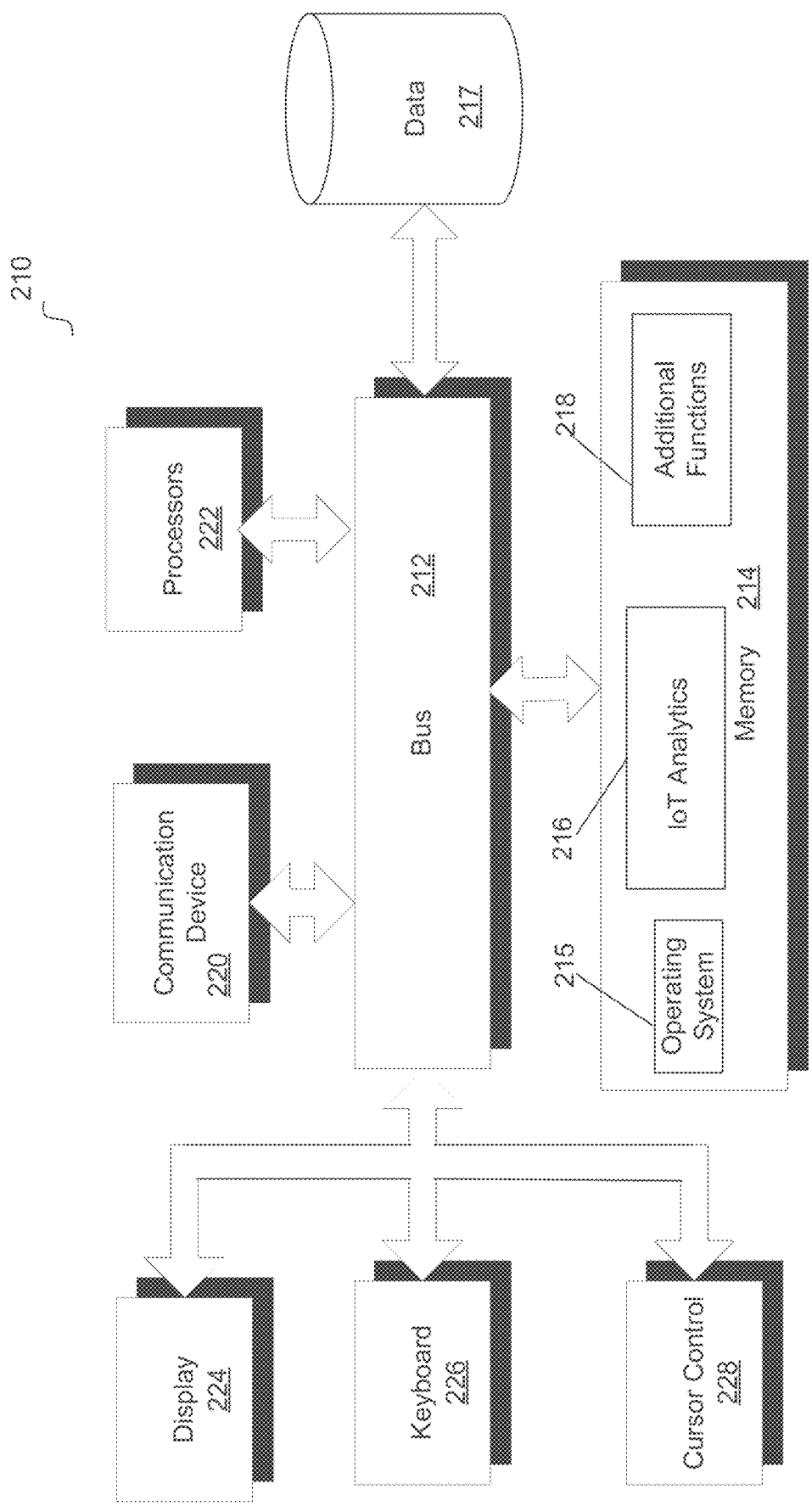
FIG. 2 illustrates a block diagram of a computing device operatively coupled to an IoT system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, IoT analytics 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, IoT analytics 216 configured to perform analytics of received IoT data, as well as other applications modules 218. Operating system 215 provides operating system functionality for system 200. In some instances, IoT analytics module 216 may be implemented as an in-memory configuration. When system 200 executes the functionality of module 216, it implements as a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include the various modules of Oracle® Cloud Infrastructure, Oracle® Cloud Platform, and/or Oracle® Cloud Applications, for example. A database 217 is coupled to bus 212 to provide centralized storage for modules 216 and 218 and to store, for example, data received from IoT connected devices. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more component of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Referring back to FIG. 1, embodiments include one or more connected devices 102 or indirectly connected devices 104 that transmit indications to IoT cloud service 106. For example, the connected device can be a device with a moveable element, such as a button, and an indication can be transmitted from the connected device to IoT cloud service 106 when the moveable element is moved (e.g., when the button is pushed). In other examples, the connected device can include a touch enabled display screen, or some other user interface element that can be used to transmit an indication. In response to the indication, IoT cloud service 106/cloud service 108/enterprise applications 110 can perform one or more functions, such as a function within an enterprise application for an enterprise business.

For example, the connected device can be located in a specific enterprise location, such as a location for an enterprise business (e.g., with multiple locations). In some embodiments, the enterprise location can be a retail location (e.g., selling products or goods), a service location (e.g., selling services that consume products or goods), or an office location for the enterprise business.

An example enterprise business can be a restaurant enterprise that has multiple retail stores that prepare food and/or sell it to customers. Another example of an enterprise business is an information technology services enterprise that has multiple locations for providing information technology services. In this example, computer related resources (e.g., laptops, disks, peripherals, printer paper, ink cartridges/toner, and the like) may be consumed by providing the information technology services. In yet another example, an enterprise business can be a corporation (e.g., large multi-national corporation) with multiple office locations that perform any number of functions/services, such as accounting, financial services, informational technology, business strategy, management, and the like. In this example, computer related resources, office related resources (e.g., pens, pencils, paper, staples/staples, coffee, snacks, and the like), or any other suitable resources may be consumed by office workers performing these functions/services.

In some embodiments, one or more connected devices can be located at one or more of these enterprise locations, and indications can be sent for one of the connected devices (e.g., to IoT cloud service 106) when a consumed resource is running low. For example, a retail enterprise location may be running low on paper cups, and an IoT connected device may be triggered to send an indication to IoT cloud service 106. The indication may indicate to the enterprise business that this retail enterprise location is in need of a replenishment of paper cups. Based on the received indication, IoT cloud service 106/cloud service 108/enterprise applications 110 can execute code to replenish the consumed resource at the corresponding enterprise location.

In some embodiments, a combination of IoT connected devices can be used to differentiate among a plurality of products. For example, IoT connected devices with a button may be organized in a pattern, and a combination of button presses can identify one of a plurality of products based on the pattern. In an embodiment, a storage/shelving unit can have a grid configuration with "m" numbers of rows and "n" numbers of columns, generating n×m different shelves/storage areas. Each row and each column can be associated with an IoT connected device. For example, the IoT connected device can be affixed to an end of each column (e.g., the top of the storage/shelving unit) and an end of each row (e.g., one side of the storage/shelving unit). In this example, the different shelves/storage areas can each correspond to a given product (e.g., a first product corresponds to row 1 and column 3, and a second product corresponds to row 3 and column 3).

A product can be identified based on a sequence of button presses, such as a press for a row followed by a press for a column or a press for a column followed by a press for a row. For example, the button of an IoT connected device associated with row 2 can be pressed followed by the button of an IoT connected device associated with column 4. Thus, the IoT connected devices and/or IoT cloud service 106/cloud service 108/enterprise applications 110 can interpret the sequence of button presses as a low stock indicator for the product corresponding to row 2 and column 4.

Figure 3:
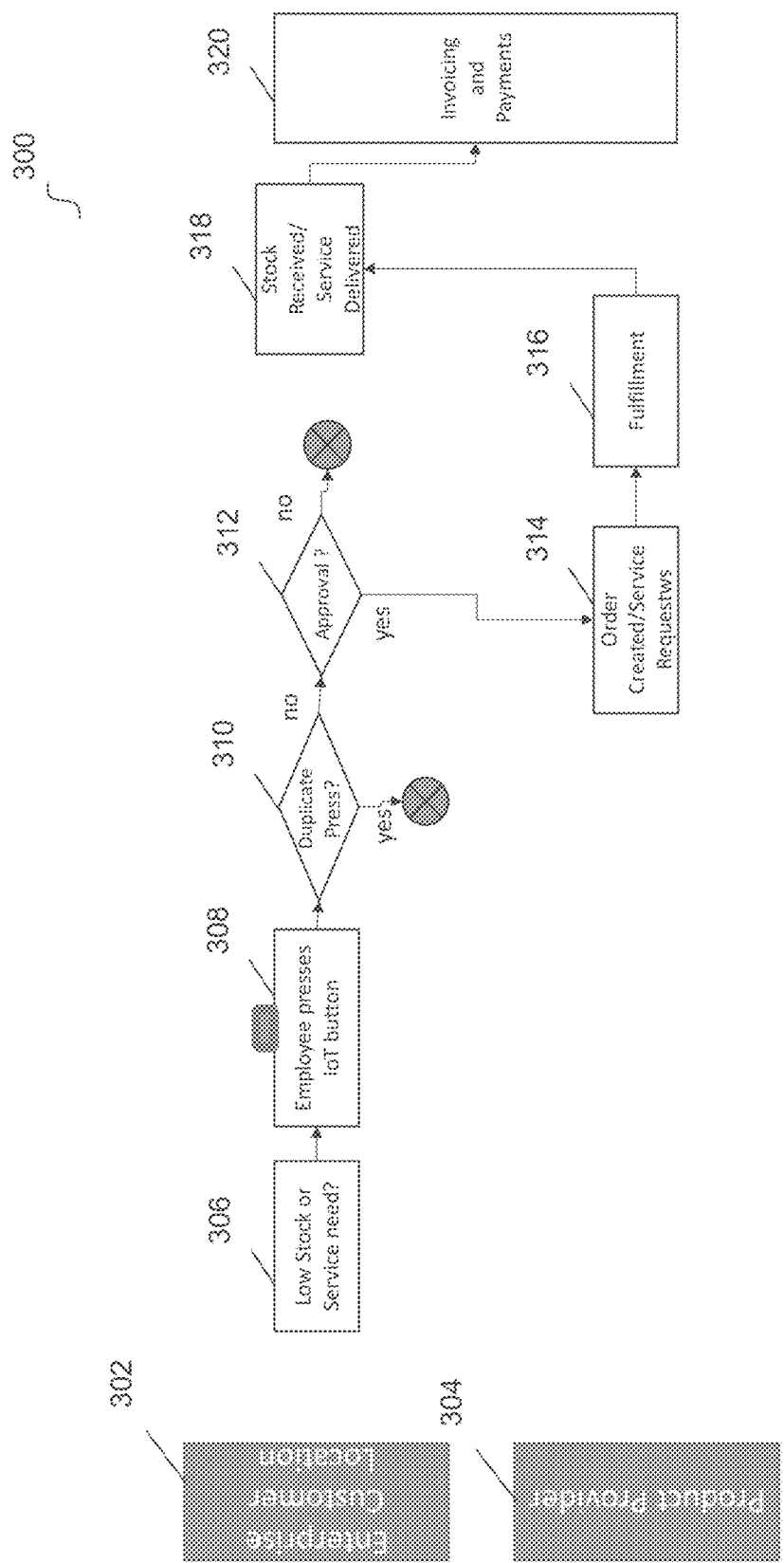
FIG. 3 illustrates a flow chart for capturing product indications from an IoT connected device of an enterprise to estimate supply and replenish according to an example embodiment.

FIG. 3 illustrates a flow chart for capturing product indications from an IoT connected device of an enterprise to estimate supply and replenish according to an example embodiment. Enterprise location 302 can be an enterprise location for an enterprise business. Product provider 304 can provide enterprise location 302 with one or more resource. For example, product provider 304 can be a warehouse of the enterprise business or an outside supplier that provides enterprise location 302 with one or more resources consumed at the location (e.g., food sold, drink cups sold, computer/office resourced consumed, and the like).

In an embodiment, at 306, an employee, customer, or some other entity could notice low stock of a product at enterprise location 302 or that a service can be performed at enterprise location 302. For example, an employee may notice low stock of a product (e.g., cups, plastic forks, writing utensils, paper or paper products, and the like) or that a service (e.g., computer service, repair service, cleaning service, and the like) can be performed at enterprise location 302.

At 308, the entity can interface with an IoT connected device at enterprise location 302 to indicate the demand condition. For example, an employee can press a button on the IoT connected device to indicate the low stock and/or service condition. Any other suitable entity and/or interface techniques (e.g., swipe, tap, and the like) can be implemented in various embodiments.

In some embodiments, the IoT connected device can be associated with the specific low stock product and/or service condition. For example, a first IoT connected device can be associated with a first product while a second IoT connected device can be associated with a second product. In some embodiments, the manner in which the employee interfaces with the IoT connected device can identify the specific low stock product and/or service condition. For example, a short click (e.g., held for less than a second) can be associated with a first product while a long click (e.g., held for greater than a second) can be associated with a second product.

In some embodiments, at 310, it can be determined whether the demand indication using the IoT connected device is a duplicate. For example, if a similar demand indication for the particular product or service was initiated over the recent past (e.g., a predetermined period of time, such as second, minutes, hours, and the like), it may be determined that the latest demand indication is a duplicate of the past one. If it is determined that the latest demand indication is a duplicate (e.g., based on a comparison with previous demand indications), flow 300 may end and return to a waiting period, where the IoT connected device is waiting for a demand indication.

If it is determined that the latest demand indication is not a duplicate, at 312 it may be determined whether an action associated with the demand indication is approved. For example, for a low stock indication, it can be determined whether approval for an order/reacquisition for additional stock of the product is approved. In another example, for a service indication, it can be determined whether approval for acquiring/buying the service is approved. Examples of approval include a list of pre-approved products that can be ordered/acquired using the IoT connected device, a list of pre-approved services that can be acquired/bought using the IoT connected device, reception of approval (e.g., an approval message) from an approval authority, such as an office manager that can transmit an approval messages (e.g., using a computing device), and the like.

If it is determined that the action is not approved, additional approvals may be sought before continuing flow 300.

In some embodiments, flow 300 may pause until the additional approval is secured. In some embodiments, flow 300 may end (e.g., when additional approval cannot be secured) and return to a waiting period, where the IoT connected device is waiting for a demand indication.

In some embodiments, at 312 when the action is approved, an order/acquisition of a product or a service request can be created. For example, the enterprise business can include one or more systems, such as an inventory system, a service request system, and the like, where product replenishments or service requests can be submitted on behalf of enterprise location 302. In other examples, an order/reacquisition of a product or a service request can be created in a system of an external entity, such as a supplier.

At 316, the created order/service request can be fulfilled. For example, a product provider 304 can ship stock of the product to enterprise location 302 or can fulfill/commission performance of the requested service. At 318, stock can be received at enterprise location 302 or the service can be performed at enterprise location 302. Accordingly, the demand indication can be satisfied by the received stock or the performed service. At 320, an invoicing and payment system can be used to perform billing/accounting for the received stock or performed service.

In some embodiments, enterprise business 302 can implement Oracle® Inventory Cloud to manage inventory and/or to receive stock from product provider 304. In some embodiments, product provider 304 can implement Oracle® Order Management to perform product/service order fulfilment. For example, referring back to FIG. 1, IoT cloud service 106 can be used to receive indications from IoT connected devices and generate product orders and/or purchase requests within an Oracle® Order Management system for product provider 304.

In some embodiments, one or more functions can be omitted from/added to flow 300. For example, the duplication press determination at 310 and/or the approval determination at 312 can be omitted from some embodiments of flow 300.

Figure 4:
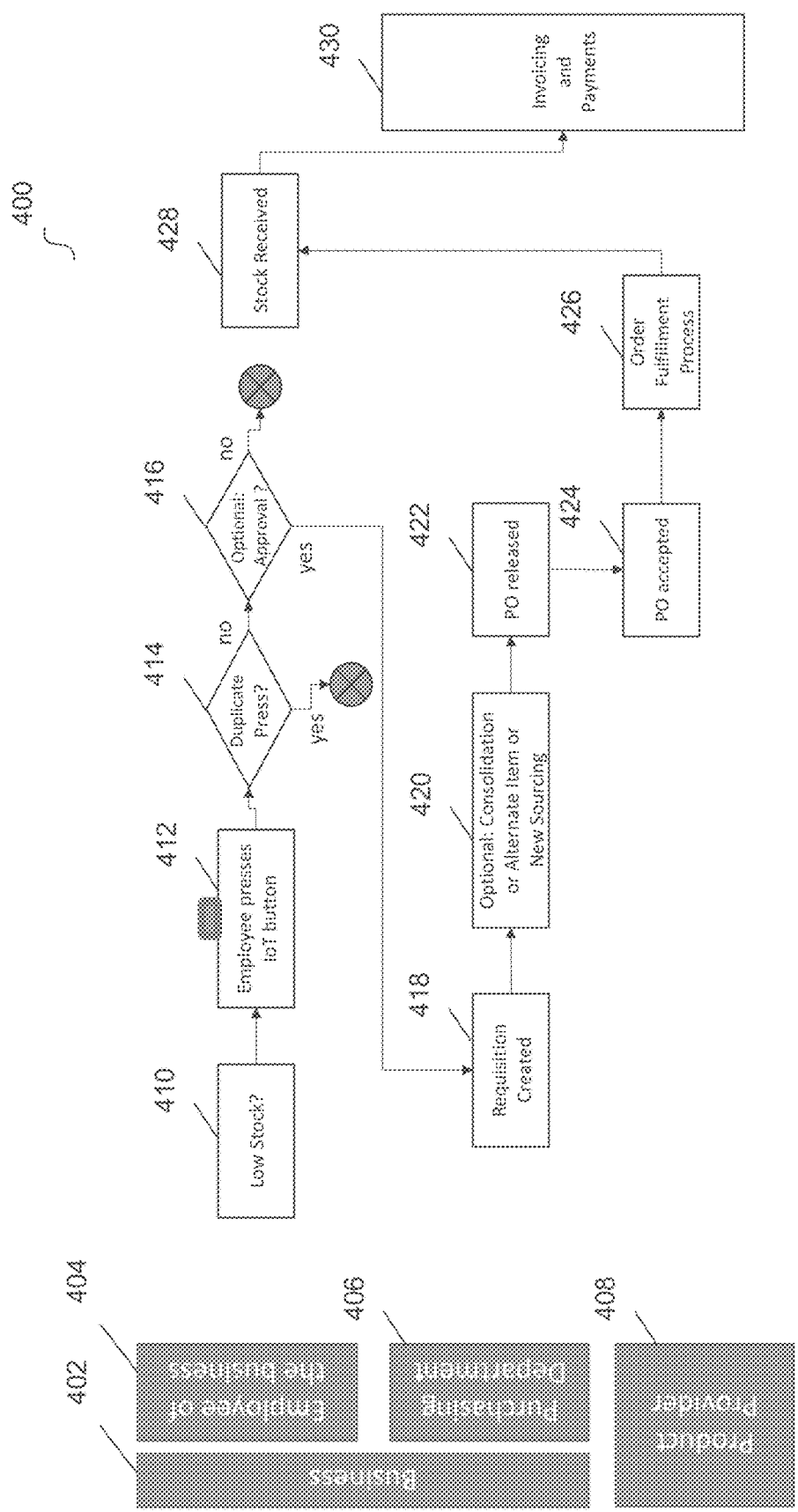
FIG. 4 illustrates a flow chart for capturing product indications from an IoT connected device to estimate supply at an enterprise and replenish from a supplier according to an example embodiment.

FIG. 4 illustrates a flow chart for capturing product indications from an IoT connected device to estimate supply at an enterprise and replenish from a supplier according to an example embodiment. Enterprise business 402 can be any suitable enterprise business, such as a retail business, a service business, a multi-national corporation, any other enterprise business previously disclosed, or any other suitable entity. Enterprise location 404 can be an enterprise location for enterprise business 402, such as a retail location, service location, office location, and the like. Purchasing department 406 can be an entity within enterprise business 402 responsible for acquiring/purchasing products or services.

In an embodiment, purchasing department 406 can represent a purchasing system that includes Oracle® Procurement Cloud and Global Order Promising, which can support transaction approval, transaction consolidation, and purchase order release. Product provider 408 can provide enterprise business 402/enterprise location 404 with one or more resource. For example, product provider 406 can be an outside supplier that provides enterprise business 402/enterprise location 404 with one or more resources consumed at the location (e.g., food sold, drink cups sold, computer/office resourced consumed, and the like).

In an embodiment, product provider 408 can include Oracle® Order Management in order to execute order fulfilment. In an embodiment, purchasing department 406 can communicate with product provider 408 using one or more software applications/frameworks, for instance using application programming interface links or through Oracle® Supplier Portal. For example, referring back to FIG. 1, IoT cloud service 106 can be used to receive indications from IoT connected devices and generate requisitions, product orders, and/or purchase requests within a purchasing system of purchasing department 406. Application programming interface links, Oracle® Supplier Portal, and any other suitable means of communication can be used to communicate (release) a purchase order to an Oracle® Order Management system of product provider 408.

In an embodiment, at 410, an employee, customer, or some other entity could notice low stock of a product at enterprise location 404 or that a service can be performed at enterprise location 404. For example, an employee may notice low stock of a product (e.g., cups, plastic forks, writing utensils, paper or paper products, and the like) or that a service (e.g., computer service, repair service, cleaning service, and the like) can be performed at enterprise location 404.

At 412, the entity can interface with an IoT connected device at enterprise location 404 to indicate the demand condition. For example, an employee can press a button on the IoT connected device to indicate the low stock and/or service condition. Any other suitable entity and/or interface techniques (e.g., swipe, tap, and the like) can be implemented in various embodiments.

In some embodiments, at 414, it can be determined whether the demand indication using the IoT connected device is a duplicate. For example, 414 of flow 400 can be similar to 310 of flow 300. If it is determined that the latest demand indication is not a duplicate, at 416 it may be determined whether an action associated with the demand indication is approved. For example, 416 of flow 400 can be similar to 312 of flow 300.

In some embodiments, at 418 when the action is approved, an order/requisition of a product or a service request can be created by purchasing department 406 based on an indication received from the IoT connected device. For example, purchasing department 406 can include one or more systems, such as an inventory system, a service request system, and the like, where product replenishments or service requests can be submitted/generated on behalf of enterprise location 404.

In an embodiment, the IoT connected device can transmit an indication to systems of purchasing department 406, for example using an IoT cloud service. In some embodiments, the indication can identify a product (or service request) and an enterprise location (e.g., enterprise location 404). For example, the order/requisition of the product or the service request can be created based on the received indication.

At 420, a sourcing determination for the created order/service request can be performed. For example, where the created order is an order for a particular product, such as paper cups, additional options may be analyzed to determine sourcing parameters. One option includes reordering a previous order of paper cups (e.g., using a previous supplier, order quantity, price, and product description). A second option includes ordering an alternate item. For example, the previous order of paper cups may include custom printing for the enterprise business (e.g., branding, logos, and the like), and it may be determined that a generic paper cup that is less expensive should be ordered to fulfill the latest order request. A third option includes ordering from a different supplier. For example, a previous order may have been placed with a first supplier, yet it may be determined (e.g., based on price, changing business relationships, and the like) that the latest order should be placed with a second supplier. A fourth option includes adjusting other aspects of the previous order, such as an order quantity, product description, and the like.

At 422, a purchase order can be released. For example, a purchase order (e.g., with the determined sourcing parameters) can be released from purchasing department 406. At 424, the purchase order can be accepted. For example, product provider 408 (e.g., the supplier indicated by the determined sourcing parameters) can accept the purchase order according to the sourcing parameters.

At 426, the created order/service request can be fulfilled. For example, a product provider 408 can ship stock of the product to enterprise location 404 or can fulfill/commission performance of the requested service. At 428, stock can be received at enterprise location 404 or the service can be performed at enterprise location 404. Accordingly, the demand indication can be satisfied by the received stock or the performed service. At 430, an invoicing and payment system can be used to perform billing/accounting for the received stock or performed service.

In some embodiments, one or more functions can be omitted from/added to flow 400. For example, the duplication press determination at 414, the approval determination at 416, and/or the sourcing determination at 420 can be omitted from some embodiments of flow 400.

Figure 5:
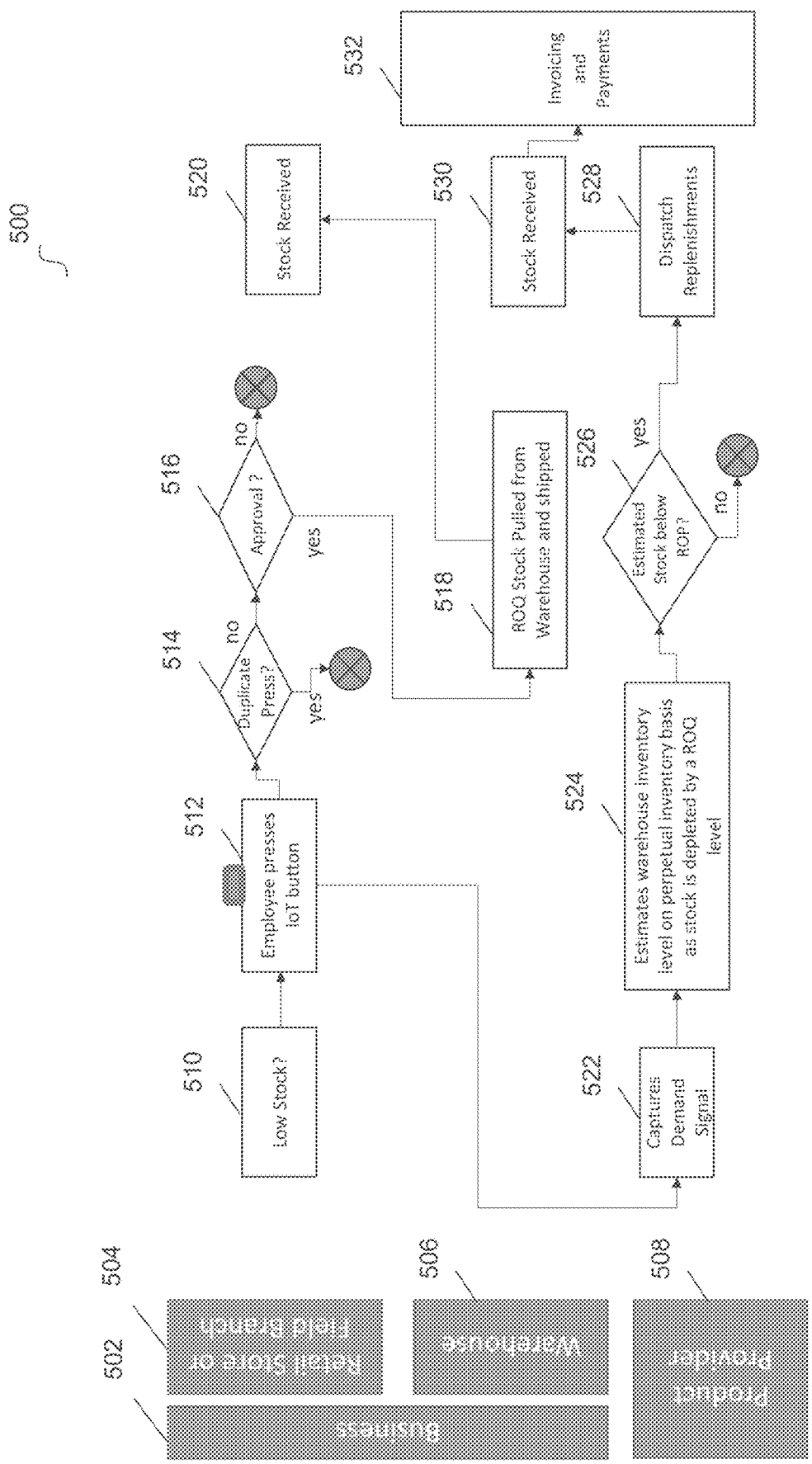
FIG. 5 illustrates a flow chart for capturing product indications from an IoT connected device to estimate supply at a warehouse and replenish from a supplier according to an example embodiment.

FIG. 5 illustrates a flow chart for capturing product indications from an IoT connected device to estimate supply at an enterprise and replenish from a supplier according to an example embodiment. Enterprise business 502 can be any suitable enterprise business, such as a retail business, a service business, a multi-national corporation, any other enterprise business previously disclosed, or any other suitable entity. Enterprise location 504 can be an enterprise location for enterprise business 502, such as a retail location, service location, office location, and the like. Warehouse 506 can be an entity within enterprise business 502 responsible for providing products to enterprise location 504. In some embodiments, warehouse 506 can be one or more warehouses responsible for providing products to (e.g., restocking) a plurality of enterprise locations of enterprise business 502 (including enterprise location 504).

Product provider 508 can provide enterprise business 502/enterprise location 504/warehouse 506 with one or more resource. For example, product provider 508 can be an outside supplier that provides enterprise business 502/enterprise location 504/warehouse 506 with one or more resources consumed at various enterprise locations of enterprise business 502 (e.g., food sold, drink cups sold, computer/office resourced consumed, and the like). In some embodiments, product provider 508 can provide warehouse 506 with one or more products, where warehouse 506 then distributes the products to one or more enterprise locations (including enterprise location 504).

In an embodiment, enterprise business 502 can include a purchasing system, such as Oracle® Procurement Cloud and Global Order Promising or Oracle® Inventory Cloud. In an embodiment, product provider 508 can include Oracle® Order Management in order to execute order fulfilment. Systems of enterprise business 502 can communicate with product provider 508 using one or more software applications/frameworks, for instance using application programming interface links or through Oracle® Supplier Portal.

In an embodiment, one or more IoT connected devices located at enterprise location 504 can communicate with internal systems of enterprise business 502 and external systems of product provider 508. For example, IoT software services can be provided by a system similar to system 100 of FIG. 1. In an embodiment, an IoT connected device and enterprise location 504 can transmit (e.g., push) one or more indications to a cloud system, and one or more applications (e.g., cloud applications, enterprise applications, and the like) can perform functions based on the indications. For example, a received indication can trigger computer code to, for example, execute a product order between enterprise business 502 and product provider 508. In some embodiments, a plurality of enterprise locations can include one or more IoT connected devices that communicate with internal systems of enterprise business 502 and external systems of product provider 508.

In an embodiment, at 510, an employee, customer, or some other entity could notice low stock of a product at enterprise location 504. For example, an employee may notice low stock of a product (e.g., cups, plastic forks, writing utensils, paper or paper products, and the like). At 512, the entity can interface with an IoT connected device at enterprise location 504 to indicate the demand condition. For example, an employee can press a button on the IoT connected device to indicate the low stock condition. Any other suitable entity and/or interface techniques (e.g., swipe, tap, and the like) can be implemented in various embodiments.

In some embodiments, at 514, it can be determined whether the demand indication using the IoT connected device is a duplicate. For example, 514 of flow 500 can be similar to 310 of flow 300. If it is determined that the latest demand indication is not a duplicate, at 516 it may be determined whether an action associated with the demand indication is approved. For example, 516 of flow 500 can be similar to 312 of flow 300.

In some embodiments, at 518 when the action is approved, stock of the product can be pulled from warehouse 506. For example, warehouse 506 can include one or more systems, such as an inventory system, a service request system, and the like, where product replenishments can be submitted/generated on behalf of enterprise location 504.

In an embodiment, the IoT connected device can transmit an indication to systems of warehouse 506, for example using an IoT cloud service. In some embodiments, the indication can identify a product and an enterprise location (e.g., enterprise location 504). A re-order quantity ("ROQ") process can be triggered at warehouse 506 to provide enterprise location 504 with the product based on the IoT connected device indication received, including performing a shipment that physically ships the product from warehouse 506 to enterprise location 504. At 520, the product stock can be received at enterprise location 504 from warehouse 506 based on the ROQ triggered process.

In some embodiments, at 512 when an entity interfaces with the IoT connected device at enterprise location 504 (e.g., an employee pushes a button) to indicate the demand condition, an indication can be transmitted to one or more systems external to enterprise business 502, such as one or more internal systems of product provider 508. At 522, the internal systems of provide provider 508 can capture the demand indication.

In various embodiments, a plurality of IoT connected devices located at a plurality of enterprise locations for enterprise business 502 can be in communication with internal systems of product provider 508. For example, indications can be received from a plurality of IoT connected devices located at different enterprise locations at different times. In some embodiments, the received IoT indications can identify a particular product and a particular enterprise location (e.g., enterprise location 504).

For example, consider ten different enterprise locations, each having an IoT connected device associated with a first product. A possible scenario includes receiving indications from different ones of the IoT connected devices (e.g., at different rates) over a period of time (e.g., days, weeks, months, and the like). For example, a first of the IoT connected devices may transmit three indications (e.g., identifying the first product) over the period of time, at a roughly 1-month period. A second of the IoT connected devices may transmit 6 indications over the period of time, at a roughly 2.5-week period. A third IoT connected device may transmit zero indications over the period of time. The remaining IoT connected devices can similarly transmit indications to product provider 508 under a variety of circumstances. Internal systems of product provider 508 can capture, store, and correlate these indications over the period of time.

At 524, inventory levels at warehouse 506 can be estimated based on the indications received from the IoT connected devices. In some embodiments, receiving an indication from an IoT connected device indicates to product provider 508 that warehouse 506 has provided the enterprise location affiliated with the transmitting IoT connected device with replenishment stock of the product. For example, since the IoT connected device transmits an indication to both product provider 508 and warehouse 506, product provider 508 can predict (or assume) that warehouse 506 has replenished stock at the corresponding enterprise location (and thus reduced the warehouse's stock for the product). In some embodiments, the indication from the IoT connected device (e.g., located at an enterprise location) can be transmitted to product provider 508 and warehouse 506 at a similar point in time (e.g., any of 512, 514, 516, or any other suitable point in flow 500).

Figure 7:
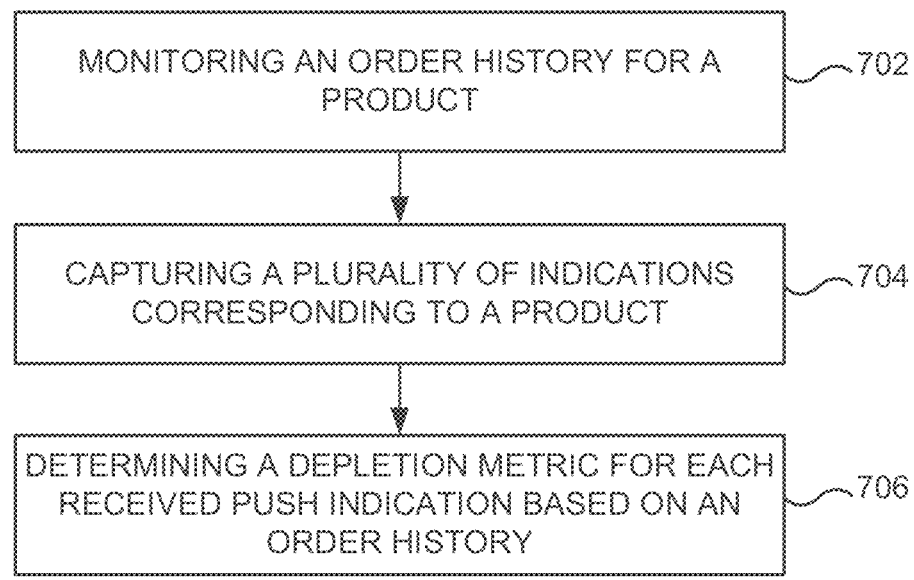
FIG. 7 illustrates a flow chart for capturing a plurality of product indications from a plurality of IoT connected devices to calculate depletion metrics according to an example embodiment.

In some embodiments, the received IoT indications captured over the period of time can correspond to depletion metrics that can be used to predict depleted stock at warehouse 506. For example, based on one or more of an order history for enterprise business 502, a history of received indications for IoT connected devices, a calculated (or assigned default) depletion metric per enterprise location and/or IoT connected device for indications received over the period of time, an estimated baseline stock for the product at warehouse 506, and any other suitable information, inventory levels for the product can be estimated at warehouse 506. FIG. 7 further describes techniques for determining depletion metrics according to various embodiments.

In some embodiments, indications can be received from a first IoT device and a second IoT device over the period of time. In an example, a default depletion metric (e.g., 15 units) can be assigned to each IoT device/enterprise location. The method of FIG. 7 illustrates a method to determine device specific or enterprise location specific depletion metrics that can be used to estimate inventory levels in some embodiments. In the above example, if one indication is received from the first IoT device and two indications are received from the second IoT device, the estimated stock depletion can be 45 units (1*15+2*15=45 units). A baseline stock at warehouse 506 can be predetermined or estimated (e.g., estimated as the previous replenishment quantity provided to warehouse 506 by product provider 508, such as 100 units). In this example, the estimated stock level at warehouse 506 can be 55 units (100−45=55 units)

At 526, it can be determined whether the estimated product inventory at warehouse 506 is below a stock threshold. For example, the stock threshold can be a predetermined or agreed upon (by enterprise business 502 and product provider 508) threshold (e.g., stock quantity) for the product. Based on the received indications, depletion metrics, and estimated inventory levels at warehouse 506, it can be determined whether the estimated inventory level is below the stock threshold.

In an embodiment, when the estimated inventory level is not below the stock threshold, flow 500 can continue to capture indications from IoT connected devices and estimate supply. In an embodiment, when the estimated inventory level is below the stock threshold, at 528, a replenishment order can be dispatched from product provider 508. For example, a product provider 508 can ship stock of the product to warehouse 506 according to the stock estimate being below the stock threshold. The replenishment order can include a predetermined and/or agreed upon quantity of stock for the relevant product.

Considering the above example, when the stock threshold is 15 units, the estimated stock level of 55 units would not be below the stock threshold. Accordingly, indications from IoT devices would continue to be captured until the estimated stock quantity was below (or at) the stock threshold of 15 units. At that point, a replenishment order (of an agreed upon quantity) of the product can be dispatched from product provider 508.

At 530, stock can be received at warehouse 506. Accordingly, the estimated low stock level can be satisfied by the dispatched replenishments. At 532, an invoicing and payment system can be used to perform billing/accounting for the replenished stock. Embodiments of stock shipments are further illustrated by FIG. 8.

Table 1.0 further illustrates an example series of events that can achieve perpetual inventory at warehouse 506 based on the described techniques:

TABLE 1.0

| Description of Events | Stock at Enterprise Location | Stock at Warehouse | Estimated Inventory at Warehouse |
|---|---|---|---|
| Initiation | 100 units | 600 units | 600 units |
| 60 units sold at enterprise location | 100 − 60 = 40 units | 600 units | 600 units |
| Individual notices inventory is low and presses button on IoT device (button press can be at any inventory level) | 40 units | 600 units | 600 units |
| ReOrder Quantity of units (90 in example) from warehouse based on button press | 40 + 90 = 130 units | 600 − 90 = 510 units | 600 units |
| Product provider receives buttons press and can estimate inventory loss at warehouse (90 units depletion metric in example) based on ReOrder Quantity | 130 units | 510 units | 600 − 90 = 510 units |
| Repetition of button press and reorder, 4x in the example | Xx Units (any units) | 510 − (90*4) = 150 | 510 − (90*4) = 150 |
| ROP (ReOrder Point or threshold) reached (160 in example). Replenish inventory at warehouse (X can be an predetermined ReOrder Quantity between enterprise business and product provider) Repeat to maintain stock at warehouse | Xx Units (any units) | 150 + X | 150 + X |

In some embodiments, the period of time (e.g., over which IoT connected device indications are captured) and the estimated baseline stock for the product at warehouse 506 can be reset (e.g., to default levels) when replenishment stock is shipped to/received at warehouse 506. The internal systems of product provider 508 can then continue flow 500 by capturing IoT device indications over a new period of time and estimating updated inventory levels at warehouse 506. Accordingly, embodiments can provide a perpetual inventory implementation for enterprise business 502/warehouse 506 without requiring access to sensitive inventory systems.

In some embodiments, product provider 508 can implement one or more of Oracle® Inventory Cloud, Oracle Order® Management, or referring back to FIG. 1, IoT cloud service 106 in order to perform the described functionality. For example, IoT cloud service 106 can be used to receive indications from IoT connected devices and generate product orders and/or replenishment transactions within an Oracle® Inventory Cloud and/or Oracle® Order Management system. In some embodiments, Oracle® Inventory Cloud and/or Oracle Order® Management can be used to accomplish processing a dispatch of goods and/or a fulfilment of goods to warehouse 506.

In some embodiments, one or more functions can be omitted from/added to flow 500. For example, the duplication press determination at 514 and/or the approval determination at 516 can be omitted from some embodiments of flow 500.

Figure 6:
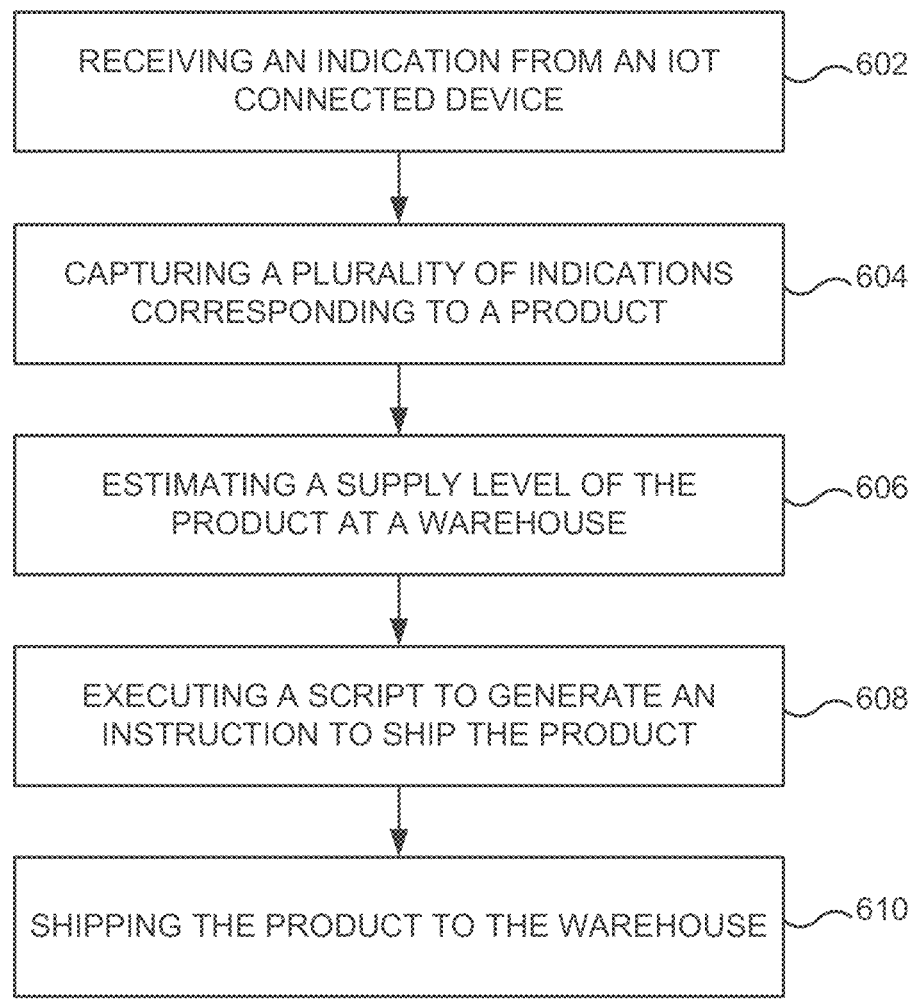
FIG. 6 illustrates a flow chart for capturing product indications from an IoT connected device to estimate supply and replenish according to another example embodiment.

FIG. 6 illustrates a flow diagram for capturing product indications from an IoT connected device to estimate supply and replenish according to another example embodiment according to an example embodiment. In one embodiment, the functionality of FIGS. 6 and 7 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 6 and 7 can be performed by one or more elements of system 100 of FIG. 1

At 602, an indication can be received from an IoT connected device located at a location, where the indication corresponds to a product stocked at the location. For example, referring to FIG. 5, an IoT connected device can be located at enterprise location 504. An entity, such as an employee, can interface with the IoT connected device (e.g., push a button) to transmit an indication from the device. In an embodiment, the indication can indicate low stock of a particular product at enterprise location 504.

In some embodiments, the IoT connected device can transmit indications to multiple systems. For example, an indication can be transmitted to an internal system of enterprise business 502 and an external system, such as an internal system of product provider 506. As disclosed with reference to FIG. 5, based on the indication, embodiments include shipping replenishment stock from warehouse 506 to enterprise location 504.

At 604, a plurality of indications corresponding to the product can be captured over a period of time. For example, an internal system of product provider 506 can capture a plurality of indications that correspond to the product over a period of time. In some embodiments, a plurality of IoT connected devices located at a plurality of enterprise locations for enterprise business 502 can be in communication with internal systems of product provider 508. For example, indications can be received and captured from a plurality of IoT connected devices located at different enterprise locations at different times. In some embodiments, the received IoT indications can identify the particular product and a particular enterprise location (e.g., enterprise location 504).

At 606, an inventory level of the product at one or more warehouses can be estimated based on the indications, where the one or more warehouses supply the location with the product. For example, warehouse 506 can supply enterprise location 502 with the product. In addition, warehouse 506 can supply a plurality of other enterprise locations with the product. The indications captured from the IoT connected devices at the various enterprise locations can indicate a depletion of inventory levels of the product at warehouse 506.

In some embodiments, the received IoT indications captured over the period of time can correspond to depletion metrics that estimate depleted stock at warehouse 506. For example, based on an order history for enterprise business 502, a history of received indications for IoT connected devices, a calculated depletion metric per enterprise location and/or IoT connected device for indications received over the period of time, an estimated baseline stock for the product at warehouse 506, and any other suitable information, inventory levels for the product can be estimated at warehouse 506.

At 610, computer code can be executed to generate an instruction to ship the product from a supplier to the one or more warehouses based on the estimated supply level. For example, based on the received indications, depletion metrics, and estimated inventory levels at warehouse 506, it can be determined whether the estimated inventory level is below a stock threshold. In an embodiment, when the estimated inventory level is below the stock threshold, software code can be executed to generate a replenishment order to replenish the stock of the product at warehouse 506.

At 612, the product can be shipped from the supplier to the one or more warehouses based on the executed computer code. For example, a replenishment order can be dispatched from product provider 508 based on the executed computer code. In some embodiments, the replenishment order can include a predetermined and/or agreed upon quantity of stock for the product.

In some embodiments, the depletion metrics for a given IoT device or enterprise location can be predetermined, known, or otherwise communicated between enterprise business 502 and product provider 508. In some embodiments, the depletion metric can be assigned based on known conditions (e.g., a size of an enterprise location, order histories, and the like) or can be a default value (e.g., 50 units). FIG. 7 further illustrates a methodology for determining device and/or enterprise location specific depletion metrics according to an embodiment.

FIG. 7 illustrates a flow diagram 700 for capturing a plurality of product indications from a plurality of IoT connected devices to estimate product supply according to an example embodiment. For example, 606 of FIG. 6 can include the functionality of flow 700. In embodiments, the functionality of flow diagram 700 is performed by hardware, software, or a combination of these.

At 702, an order history for a product can be monitored. For example, referring to FIG. 5, an order history of enterprise business 502/warehouse 506 for products form product provider 508 can be monitored. In some embodiments, the order history can be monitored to identify ordered quantities of a particular product over a period of time. For example, prior to implementing the perpetual inventory techniques described herein, a manual order history (e.g., order history requested by enterprise business 502/warehouse 506 from product provider 508) can be monitored to determine depletion metrics.

At 704, a plurality of indications can be captured form a plurality of IoT connected devices that correspond to the product. In some embodiments, over the period of time for the order history, indications for the product can be captured from a plurality of IoT connected devices located at a plurality of enterprise locations. Accordingly, over the period of time, quantities can be determined for each of: overall product quantity shipped to warehouse 506 from product provider 508 and number of indications received from each IoT connected device/enterprise location.

At 706, depletion metrics can be predicted that predict a stock depletion from warehouse 506 for each indication received from an IoT connected device located at a given enterprise location. For example, using known quantities from the order history and captured indications, prediction equations can be generated to determine/estimate each depletion metric.

For example, at a first time, a first stock quantity of the product can be provided to warehouse 506 (e.g., 85 units of the product). In some embodiments, an initial stock quantity at warehouse 506 can be assumed to be the first stock quantity plus some remaining stock previously held at warehouse 506 (further considered below). At a second time, a replenishment order from enterprise business 502/warehouse 506 can be received, thus indicating that product stock at warehouse 506 is below a threshold quantity. In some embodiments, the replenishment order can be manually submitted (e.g., by enterprise business 502/warehouse 506). Thus, it can be predicted that between the first time and the second time, a bulk percentage of the initial stock quantity has been depleted from warehouse 506 (e.g., 85% of the 100 units, 90%, or the like).

Between the first time and the second time, indications for the product from IoT connected devices at the various enterprise locations serviced by warehouse 506 can be captured. For example, given a first, second, and third IoT device, four, two, and three indications can be captured, respectively. Recall that each indication can indicate low stock at an enterprise location serviced by warehouse 506, and further triggers shipment of the product from warehouse 506 to the relevant enterprise location. In other words, the four indications from the first IoT device can indicate four shipments of product from warehouse 506 to the enterprise location associated with the first IoT device. Similarly, two indications from the second IoT device can indicate two shipments of product from warehouse 506 to the enterprise location associated with the second IoT device and three indications from the third IoT device can indicate three shipments of product from warehouse 506 to the enterprise location associated with the third IoT device.

Further recall that between the first and second time, it can be assumed that a bulk percentage of the initial stock quantity has been depleted from warehouse 506 (e.g., depleted based on shipments to enterprise locations associated with the first, second, and third IoT devices). In some embodiments, it can be assumed that the first stock quantity (e.g., 85 units) has been depleted between the first and second time. For example, when the first stock quantity was received (at the first time), existing stock was likely present. This existing stock was likely below some threshold reorder quantity for enterprise business 502. At the time of the replenishment order (at the second time), again existing stock is likely present that is below the same threshold reorder quantity for enterprise business 502. Thus, it can be assumed that the first stock quantity (e.g., 85 units) has been depleted between the first time and the second time.

In some embodiments, and based on the above example, the following prediction equation can be generated based on received indications from the first, second, and third IoT devices: $85 \approx 4x+2y+3z$. In this equation, "x" can represent a depletion metric for the first IoT device (or for the enterprise location associated with the first IoT device), "y" can represent a depletion metric for the second IoT device (or for the associated enterprise location), and "z" can represent a depletion metric for the third IoT device (or for the associated enterprise location).

In some embodiments, over time, multiple prediction equations can be generated based on the order history and received (manual) replenishment orders. For example, based an order history over three distinct periods of time that correspond to three replenishment orders (and based on captured IoT device indications over the three periods of time), the corresponding prediction equations can be:

$$85 \approx 4x+2y+3z;\ 85 \approx 3x+1y+6z;\ 85 \approx 2x+3y+4z;$$

A software program (e.g., solver) can be used to predict the values of the depletion metrics given the available information (e.g., prediction equations). For example, given the above prediction equations, "x" can be estimated at 10 units "y" can be estimated at 12 units, and "z" can be estimated at 7 units. In other words, a depletion metric for the first IoT device (or for the enterprise location associated with the first IoT device) can be predicted at 10 units, a depletion metric for the second IoT device (or for the associated enterprise location) can be predicted at 12 units, and a depletion metric for the third IoT device (or for the associated enterprise location) can be predicted at 7 units.

In some embodiments, based on the predicted depletion metrics for individual IoT devices or individual enterprise locations, the techniques disclosed herein can be used to achieve perpetual inventory. For example, the predicted depletion metrics can be used by the functionality described with reference to FIGS. 5 and 6 to estimate depletion of product stock at warehouse 508 and subsequently to ship product stock to the warehouse and achieve perpetual inventory.

Figure 8:
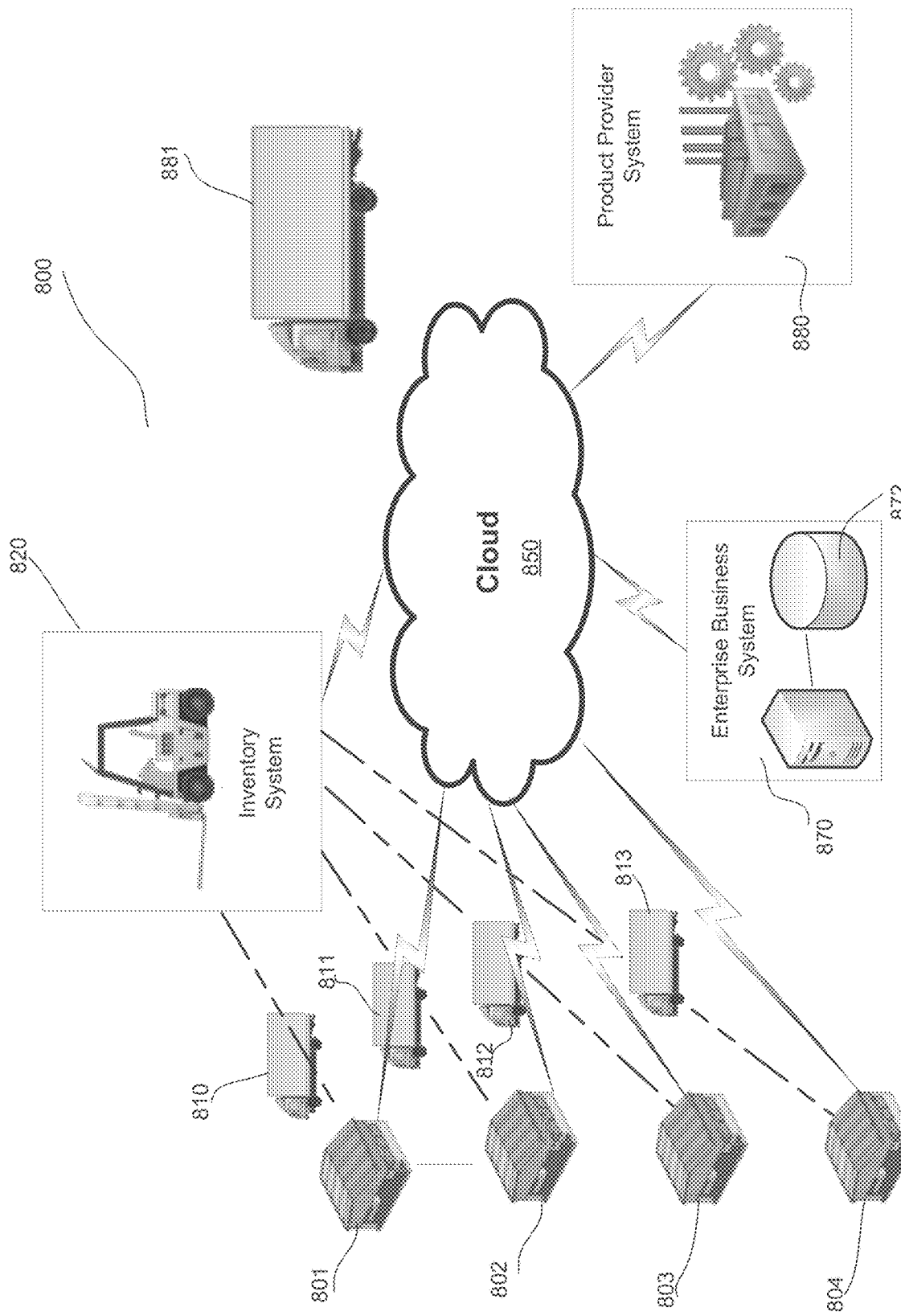
FIG. 8 illustrates an integrated supplier, inventory, and logistics system that includes stock prediction and replenishment as disclosed herein according to an example embodiment.

FIG. 8 illustrates an integrated supplier, inventory, and logistics system that includes stock prediction and replenishment as disclosed herein according to an example embodiment. As shown in FIG. 8, system 800 can include an enterprise business system 870 that receives indications from IoT connected devices located at enterprise locations 801-804, and executes code to replenish stock of a product at the enterprise locations or orders stock of the product form product provider system 880. Enterprise business system 870 is in communication through a cloud network 850 or other type of communications network with one or more inventory system 820 and one or more product provider system 880.

Inventory system 820 stores inventory and provides transportation logistics to deliver items to enterprise locations 801-804 using trucks 810-813 or some other transportation mechanisms. Inventory system 820 in one embodiment implements an Enterprise Resource Planning ("ERP") specialized computer system or a specialized inventory control system that uses input from enterprise business system 810 to determine levels of inventories and the amount and timing of the delivery of products to enterprise locations 801-804.

Product provider system 880 supplies one or more products to warehouses of inventory system 820 and provides transportation logistics to deliver the products to inventory system 820 using a truck 881 or some other transportation mechanisms. Product provider system 880 in one embodiment implements an ERP specialized computer system or a specialized supplier system that uses input from IoT connected devices located at enterprise locations 801-804 to determine an amount of and timing for product shipments to inventory system 820.

As previously discussed, depletion of a product in an enterprise setting can be challenging to predict based on constraining circumstances. For example, a lack of transparency between inventory system 820 and product provider system 880 can create an opaque layer between the enterprise business and the product provider. However, use of IoT connected devices at enterprise locations 801-804 that transmit indications can allow depletion estimation of supply for a product without exposing precise supply numbers. Using the depletion estimation to schedule shipments from product provider system 880 to inventory system 820 can provide the benefits of perpetual inventory without the ramifications of over exposure of sensitive enterprise information.

Embodiments capture product indications from an IoT connected device to estimate supply and replenish. Enterprise implementations of stock replenishment can encounter problems due to the complex circumstances for enterprise organizations. For example, enterprise inventory is often considered highly confidential since competitors could use such information to place the enterprise at a competitive disadvantage. Accordingly, precise levels of enterprise inventory can be hidden from partners that do business with the enterprise, such as suppliers of product. In addition, because an enterprise will often stock inventory at a central location (e.g., warehouse) and distribute the inventory as needed to various locations (e.g., enterprise locations), each IoT device indication received from an enterprise location does not correspond to an immediate need for new product from the supplier.

In various embodiments, an internal system of the supplier can estimate supply levels (e.g., according to determined depletion metrics) at an enterprise warehouse to compensate for the problems caused by these complex circumstances. For example, the estimated supply is unlikely to cause competitive disadvantages because of its degree of precision. In particular, the stock estimate is precise enough to use to predict timely product shipments, but not so precise as to give competitors valuable information to use against the enterprise. In addition, embodiments determine device specific (e.g., specific to the transmitting IoT device) or location specific (e.g., specific to the location from which the IoT device transmitted the indication) depletion metrics, thus addressing the problem posed by a central warehouse distributing product to a plurality of enterprise locations. Accordingly, the technological solution provided by embodiments of the disclosure provide a number of advantages that can overcome specific problems in the industry.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for capturing product indications from an Internet of Things (IoT) connected device to estimate supply and replenish, the method comprising:
   receiving a plurality of indications from a plurality of IoT connected devices located at a plurality of locations, the indications corresponding to a product stocked at the locations, wherein the locations comprise a plurality of enterprise locations for an enterprise business, and the product is sold or consumed at the locations;
   capturing the plurality of indications corresponding to the product from the plurality of IoT connected devices located at the plurality of locations over a period of time;
   estimating, based on the indications, a supply level of the product at one or more warehouses by determining a depletion metric for the indications, the depletion metric comprising an estimation of supply depletion of the product at the one or more warehouses, the depletion metric for at least a first portion of the plurality of indications being different from the depletion metric for at least a second portion of the plurality of indications, wherein the one or more warehouses supply the locations with the product;
   executing computer code to generate an instruction to ship the product from a supplier to the one or more warehouses based on the estimated supply level; and
   shipping the product from the supplier to the one or more warehouses based on the executed computer code.

2. The method of claim 1, wherein,
   the product comprises a specific product or replacements for the specific product, and
   the product is shipped from the one or more warehouses to the locations based on indications received from the IoT connected devices.

3. The method of claim 2, wherein the IoT connected devices comprise a button that communicates using a wireless communication protocol, and the indication is transmitted using the wireless communication protocol in response to a push of the button.

4. The method of claim 1, wherein the estimating of the supply level of the product at the one or more warehouses is performed by an internal system for the supplier.

5. The method of claim 4, wherein the internal system for the supplier does not have access to inventory levels for the product stored by an inventory system of the enterprise business.

6. The method of claim 5, wherein the indications from the IoT connected devices are received by an internal system for the enterprise business and the internal system for the supplier, and the internal system for the enterprise business is separate from the internal system for the supplier.

7. The method of claim 1, further comprising executing the computer code to generate the instruction to ship the product from the supplier to the one or more warehouses when the estimated supply level is below a threshold, wherein shipments to the one or more warehouses from the supplier based on the executed computer code achieve perpetual inventory for the product at the one or more warehouses.

8. The method of claim 1, wherein the depletion metric for the received indications is determined based on an order history of the enterprise business with the supplier for the product and received indications from the plurality of IoT connected devices over a time for the order history.

9. The method of claim 8, wherein a device specific depletion metric is determined for one or more of the plurality of IoT connected devices.

10. The method of claim 1, further comprising:
    receiving approval from the enterprise business for the shipping of the product from the supplier to the one or more warehouses.

11. A non-transitory computer readable medium having instructions stored thereon that, when executed by a processor, cause the processor to capture product indications from an Internet of Things (IoT) connected device to estimate supply and replenish, wherein, when executed, the instructions cause the processor to:
    receive a plurality of indications from a plurality of IoT connected devices located at a plurality of locations, the indications corresponding to a product stocked at the locations, wherein the locations comprise a plurality of enterprise locations for an enterprise business, and the product is sold or consumed at the locations;
    capture the plurality of indications corresponding to the product from the plurality of IoT connected devices located at the plurality of locations over a period of time;
    estimate, based on the indications, a supply level of the product at one or more warehouses by determining a depletion metric for the indications, the depletion metric comprising an estimation of supply depletion of the product at the one or more warehouses, the depletion metric for at least a first portion of the plurality of indications being different from the depletion metric for at least a second portion of the plurality of indications, wherein the one or more warehouses supply the locations with the product;
    execute computer code to generate an instruction to ship the product from a supplier to the one or more warehouses based on the estimated supply level; and
    ship the product from the supplier to the one or more warehouses based on the executed computer code.

12. The computer readable medium of claim 11, wherein,
    the product comprises a specific product or replacements for the specific product, and
    the product is shipped from the one or more warehouses to the locations based on indications received from the IoT connected devices.

13. The computer readable medium of claim 11, further comprising executing the computer code to generate the instruction to ship the product from the supplier to the one or more warehouses when the estimated supply level is below a threshold, wherein shipments to the one or more warehouses from the supplier based on the executed computer code achieve perpetual inventory for the product at the one or more warehouses.

14. A system for capturing product indications from an Internet of Things (IoT) connected device to estimate supply and replenish, the system comprising:
- a processor; and
- a memory storing instructions for execution by the processor, the instructions configuring the processor to:
- receive a plurality of indications from a plurality of IoT connected devices located at a plurality of locations, the indications corresponding to a product stocked at the locations, wherein the locations comprise a plurality of enterprise locations for an enterprise business, and the product is sold or consumed at the locations;
- capture the plurality of indications corresponding to the product from the plurality of IoT connected devices located at the plurality of locations over a period of time;
- estimate, based on the indications, a supply level of the product at one or more warehouses by determining a depletion metric for the indications, the depletion metric comprising an estimation of supply depletion of the product at the one or more warehouses, the depletion metric for at least a first portion of the plurality of indications being different from the depletion metric for at least a second portion of the plurality of indications, wherein the one or more warehouses supply the locations with the product;
- execute computer code to generate an instruction to ship the product from a supplier to the one or more warehouses based on the estimated supply level; and
- ship the product from the supplier to the one or more warehouses based on the executed computer code.

15. The system of claim 14, wherein,
- the product comprises a specific product or replacements for the specific product, and
- the product is shipped from the one or more warehouses to the locations based on indications received from the IoT connected devices.

16. The method of claim 1, wherein the depletion metric for at least a first portion of the plurality of indications is different from the depletion metric for at least a second portion of the plurality of indications.

17. The computer readable medium of claim 11, wherein the depletion metric for at least a first portion of the plurality of indications is different from the depletion metric for at least a second portion of the plurality of indications.

18. The system of claim 14, wherein the depletion metric for at least a first portion of the plurality of indications is different from the depletion metric for at least a second portion of the plurality of indications.

19. The computer readable medium of claim 11, wherein the depletion metric for the received indications is determined based on an order history of the enterprise business with the supplier for the product and received indications from the plurality of IoT connected devices over a time for the order history.

20. The method of claim 8, wherein a location specific depletion metric is determined for one or more of the plurality of enterprise locations.

* * * * *